July 18, 1939.  F. J. BRADLEY  2,166,738
TRAILER HITCH AND BRAKE
Filed Nov. 4, 1936
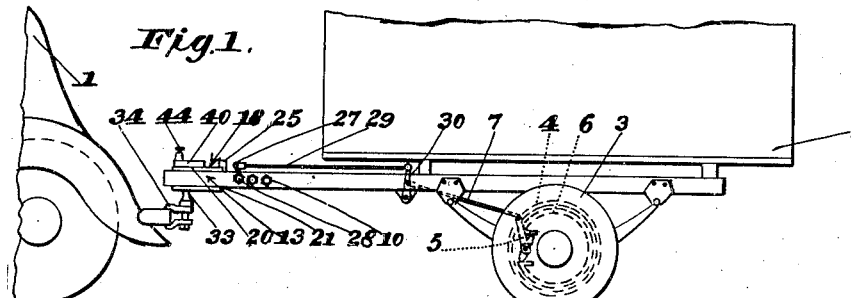
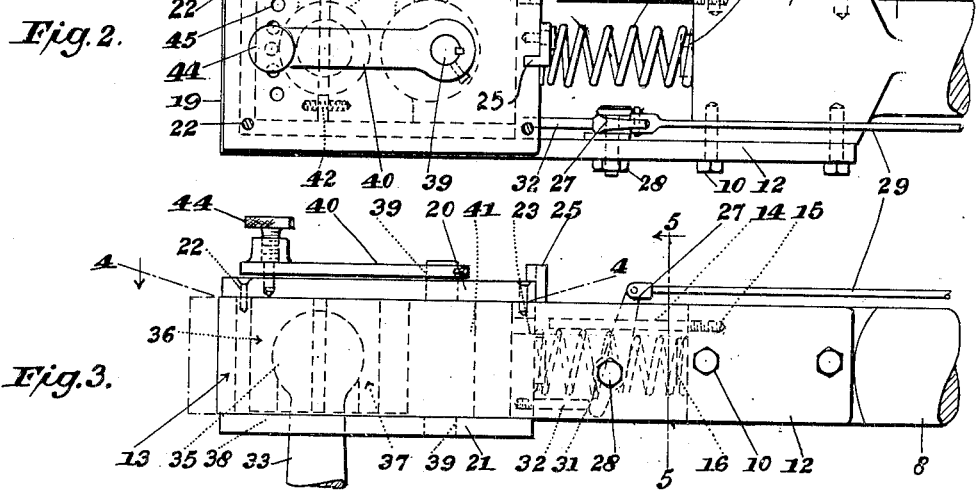
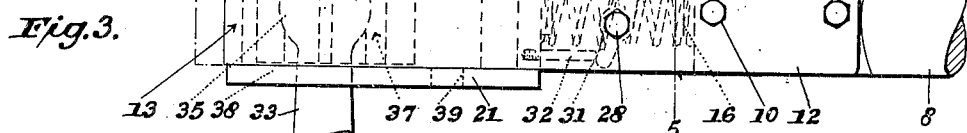
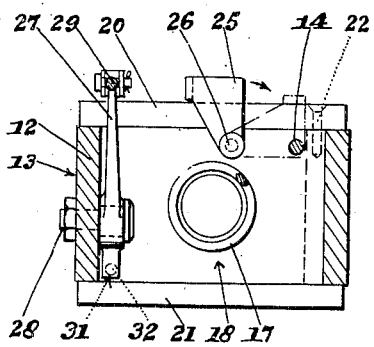
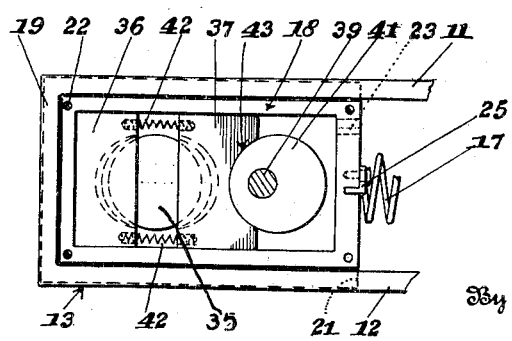
Inventor
F. J. Bradley
By Munn Anderson & Liddy
Attorney Patented July 18, 1939

2,166,738

UNITED STATES PATENT OFFICE 2,166,738

TRAILER HITCH AND BRAKE

Freeman J. Bradley, Ypsilanti, Mich., assignor to Bruce L. Bradley, Ypsilanti, Mich.

Application November 4, 1936, Serial No. 109,193

3 Claims. (Cl. 188—112)

This invention relates to improvements in trailer hitches and the like, and its objects are as follow:

First, to provide a combination hitch and brake actuating means for trailers, the hitch being so arranged that a forward movement of the trailer relatively to the hitch, due to the momentum of the trailer when the brakes of the pulling motor vehicle are applied, causes the application of the brakes on the trailer as well, thus insuring the stopping of the trailer and relieving the motor vehicle brakes of the virtually double duty that they would otherwise be required to perform.

Second, to provide an effective braking means for automobile trailers, that is closely connected with the hitch assemblage and still has no special power source furnished by the pulling or touring vehicle.

Third, to provide an improved hitch which is easy and conveniently operated, thus allowing the trailer to be hitched and detached to and from the pulling motor vehicle with a minimum effort on the part of the driver.

Other objects and advantages will appear in the following specification, reference being had to the accompanying drawing, in which:

Figure 1 is a side elevation of portions of a pulling automobile and a trailer, especially illustrating the improved hitch and brake.

Figure 2 is a plan view of the combined hitch and brake actuating means,

Figure 3 is a side elevation of the structure shown in Figure 2,

Figure 4 is a detail horizontal section taken on the line 4—4 of Figure 3, and

Figure 5 is a detail cross section taken on the line 5—5 of Figure 3.

The growing practice of automobile tourists to supplement their rolling equipment with trailer houses or trailers, as they are more generally called, has developed the problem of supplying sufficient braking power to slow and stop the trailer as well as the pulling automobile. In other words, when the driver applies the brakes of his motor vehicle it is now necessary for the braking power to do virtually double duty in slowing and stopping the trailer as well.

It so happens that modern four-wheel brakes produce ample braking power for the two-fold purpose, but the braking power may not be sufficient if the master brakes are at less than their maximum efficiency. Therefore it is herein proposed to not only provide the trailer with a set of brakes of its own but also to so improve the hitch that the brake-actuating means of the trailer brakes will be actuated automatically by the forward momentum of the trailer in the manner presently explained.

In the drawing, 1 designates a portion of any type of pulling motor vehicle. For that matter it is not essential that the vehicle be motor driven because the principles of the invention will work just as well if the pulling vehicle is propelled by some other power source. The trailer is designated 2, the wheels of the latter 3, and the brake drum 4. It will be understood that the trailer has at least two wheels and that at least one of these has a brake drum. A lever 5 is so arranged as to operate the brake shoe 6, the free end of the lever being connected by a cable or link 7 with the brake-actuating means.

The trailer 2 has a tongue 8 which terminates in a head 9 (Fig. 2). This head is rigidly fixed at 10 between the members 11 and 12 of a U-shaped guide 13. The guide 13 is thus a fixed part of the trailer tongue.

An arm 14 projects forwardly from the head 9, being fixed therein at 15. The forward face of the head has a spring seat 16 of any desired type, whether in the form of the outstanding abutment shown or in the form of a recess. One end of a shock absorbing spring 17 is mounted on the seat 16, the opposite end of this spring engaging a similar seat on a movable hitch lock, generally designated 18 (Fig. 4).

This hitch lock comprises a rectangular frame which fits and is movable in the U-shaped guide 13, normally occupying the position shown adjacent to the closed end 19 of the guide 13, being held thereby the spring 17. The hitch lock has top and bottom plates 20, 21 secured to it by screws 22, or equivalent means, the lateral margins of these plates overlapping and riding upon the members 11, 12 of the guide so as to sustain the movable hitch lock in its operative position.

There is a hole 23 in the rear end of the hitch lock 18, and this hole is directly in line with the arm 14, so that the arm 14 can project on through when permitted. Normally there is some space 24 (Fig. 2) between the forward end of the arm 14 and the rear surface of the hitch lock 18 so that there will be room enough for a brake release gate 25 to be swung on its pivot 26 (Fig. 5) into an obstructing position.

A lever 27 is pivoted to the member 12 of the guide 13 as at 28. One end of this lever is connected by means of a cable or link 29 with an idler lever 30 (Fig. 1) to which the foregoing cable or link 7 is connected. The elements 4, 5, 6, 29 and 30 constitute the braking mechanism.

The other end of the lever 27 abuts at 31 (Fig. 3) the free end of a brake plunger arm 32 which, in turn, is secured to the hitch lock 18.

A hitch 33 is secured at 34 (Fig. 1) to an appropriate part of the vehicle 1 by any desired type of clamp. The hitch terminates in a ball 35, and this ball has a connection with the hitch lock 18 that is made in this way: A half socket 36 (Fig. 4) is secured in the forward end of the hitch lock in any appropriate way. The complemental movable half socket 37 is sustained in the hitch lock 18 by resting on the bottom plate 21. The latter has a hole 38 (Fig. 3) which admits the ball 35. The shaft 39 of a release arm 40 is journaled in the top and bottom plates 20, 21, the arm being secured to the projecting end of the shaft. Said shaft carries an eccentric 41 (Fig. 4), a pair of springs 42 between the two half sockets pressing the movable half toward the shaft 39 so that the curved seat 34 therein makes an effective contact with the eccentric 41.

A spring-actuated lock 44 on the free end of the arm 40 is adapted to be seated in the desired one of a series of holes 45 in the top plate 20. The purpose of the series of holes is to permit adjusting the eccentric 41 to counteract any appreciable wear between the eccentric and the movable socket 37. The arm 40 is shown at its maximum adjustment. When the parts are new the lock 44 will be seated in one of the holes to the right or left of the center. Further, the series of holes 45 enables the adjustment of the grip of the socket 37 upon the ball according to the desired amount of friction.

The operation is readily understood. When the trailer 2 is initially attached to the motor vehicle 1, the lock 44 is first raised and the release arm 40 is swung to one side. The springs 42 make the movable socket 37 follow the eccentric 41 (Fig. 4) so that there is a full opening for the ball 35 when the trailer tongue is set down upon the hitch 33. The latter having been accomplished, the arm 40 is swung around again and secured in the desired one of the holes 45 by releasing the lock 44.

The gate 25 is normally up (full lines, Fig. 5). This gate can be controlled from the driver's seat if desired. In fact, this is preferable, although a control is not shown, so as to avoid the necessity of the driver leaving his seat when it is desired not to have the brake mechanism to function. So, it is repeated, the gate 25 is normally up, leaving the hole 23 unobstructed and open for the admission of the arm 14.

Now assume that both vehicles are in locomotion, and that the brakes of the pulling motor vehicle 1 are being applied. The forward momentum of the trailer 2 makes the tongue 8 and guide 13 go forward. Since the entire hitch lock 18 (Fig. 4) is clamped onto the hitch 33, the guide 13 moves forwardly in reference to it. Or, what is the same thing, the hitch lock 18 moves rearwardly in reference to the guide. In either case the arm 32, which comprises a solid abutment, turns the lever 27 counterclockwise. This pulls the cable 29 and actuates the brake mechanism of which said cable is a part. The brake shoe 6 of the trailer brake is thus applied and, as must be understood from the preceding explanation, the application of the trailer brakes is wholly automatic.

In the foregoing operation the arm 14 simply projects into the hole 23. There are times when it is desired and necessary to back the motor vehicle 1. At such times it is equally necessary not to apply the trailer brakes. Preparatory to thus backing the vehicle 1, the driver lets the gate 25 down so as to close the hole 23 and obstruct the arm 14. This obstruction prevents relative motion between the guide 13 and the hitch lock 18 so that regardless of how much backing the driver does the trailer brakes will not be applied.

I claim:

1. A hitch comprising a guide, a hitch lock and means by which it is movably held upon the guide, a pair of sockets embodied in the hitch lock, one of the sockets being movable and there being at least one spring between the sockets, an eccentric in end contact with the movable socket, said spring keeping the movable socket in contact with the face of the eccentric, and means by which to turn the eccentric so as to cause closing of the sockets in respect to a part on a pulling vehicle, and a spring so stationed as to tend to prevent relative movement of the hitch lock and guide.

2. A trailer hitch comprising a guide which is securable to a trailer, a hitch lock and means by which it is movably carried by said guide, said lock having means enabling its connection to a pulling vehicle, and said lock having a hole, a lever pivotally carried by the guide, one of its ends being connectible with brake mechanism of the trailer, a pin on the guide confronting the other end of said lever, and an arm projecting from a part of said trailer in line with the hole.

3. A trailer hitch comprising a guide which is securable to a trailer, a hitch lock and means by which it is movably carried by said guide, said lock having means enabling its connection to a pulling vehicle, and said lock having a hole, a lever pivotally carried by the guide, one of its ends being connectible with brake mechanism of the trailer, a pin on the guide confronting the other end of said lever, an arm projecting from a part of said trailer in line with the hole, and means movably carried by the hitch lock for temporarily closing the hole.

FREEMAN J. BRADLEY.